(12) United States Patent
Love et al.

(10) Patent No.: US 7,280,622 B2
(45) Date of Patent: Oct. 9, 2007

(54) LOW-COMPLEXITY HIERARCHICAL DECODING FOR COMMUNICATIONS SYSTEMS USING MULTIDIMENSIONAL QAM SIGNALING

(75) Inventors: David J. Love, Garland, TX (US); Srinath Hosur, Plano, TX (US); Anuj Batra, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 738 days.

(21) Appl. No.: 10/644,545

(22) Filed: Aug. 20, 2003

(65) Prior Publication Data

US 2004/0052317 A1    Mar. 18, 2004

Related U.S. Application Data

(60) Provisional application No. 60/404,860, filed on Aug. 21, 2002.

(51) Int. Cl.
*H03D 1/00* (2006.01)
*H04L 27/06* (2006.01)
(52) U.S. Cl. ...................................... 375/340
(58) Field of Classification Search ........ 375/340–341, 375/262, 265, 316
See application file for complete search history.

(56) References Cited

U.S. PATENT DOCUMENTS

| | | | |
|---|---|---|---|
| 6,452,964 B1 * | 9/2002 | Yoshida | 375/222 |
| 6,470,047 B1 * | 10/2002 | Kleinerman et al. | 375/232 |
| 2003/0142765 A1 * | 7/2003 | Poklemba et al. | 375/341 |

* cited by examiner

*Primary Examiner*—Jean B. Corrielus
(74) *Attorney, Agent, or Firm*—Steven A. Shaw; W. James Brady; Frederick J. Telecky, Jr.

(57) ABSTRACT

A reduced search space minimum distance decoding method provides average probability of error performance close to optimal MAP decoding. The decoding algorithm provides dramatic complexity reductions compared with MAP decoding. A a sub-optimal decoder receives a collection of signal vectors $y_1 \ldots y_k$, with k denoting a positive integer and generates an estimated transmitted multidimensional symbol $\tilde{S}$. The estimated transmitted multidimensional symbol $\tilde{S}$ is decoded using hierarchical subset decoding a subset is determined therefrom. A reduced search space V is generated and minimum distance decoding is used to decode the received symbol vectors $y_1 \ldots y_k$ in the reduced search space V. one or more of the following: an estimated multidimensional symbol $\tilde{S}$, soft bit information, or hard bit information are cienerated therefrom.

12 Claims, 1 Drawing Sheet

LOW-COMPLEXITY HIERARCHICAL DECODING FOR COMMUNICATIONS SYSTEMS USING MULTIDIMENSIONAL QAM SIGNALING

CLAIM TO PRIORITY OF PROVISIONAL APPLICATION

This application claims priority under 35 U.S.C. § 119(e)(1) of provisional application Ser. No. 60/404,860, TI-35080PS, filed Aug. 21, 2002, by David J. Love, Srinath Hosur and Anuj Batra.

BACKGROUND OF THE INVENTION

1. Field of the Invention

This invention relates generally to multiple-input multiple-output (MIMO) communication systems. More particularly, this invention relates to a sub-optimal minimum distance (MD) decoder that outperforms known sub-optimal decoders associated with real-time systems.

2. Description of the Prior Art

Multiple-input multiple-output (MIMO) communication systems provide gain in capacity and quality compared to single-input single-output (SISO) communication systems. While a SISO system employs one transmitter and one receiver to receive the transmitted signal, a MIMO system in general uses $M_t \geq 1$ transmitters and $M_r \geq 1$ receivers. Thus the SISO system is a special case of a MIMO system, with $M_t = M_r = 1$. Examples of MIMO systems include but are not limited to: 1. A communication system employing multiple-antennas at the transmitter and/or receiver; 2. A communication system employing orthogonal frequency division multiplexing (OFDM) or code division multiplexing (CDMA); 3. A time/frequency division multiple access system; 4. Any multiuser communication system; 5. Any combination of 1-4 above.

Typically, the MIMO systems consist of a MIMO transmitter that sends "multidimensional" symbol information. This multidimensional symbol could, but is not limited to, be represented by a vector (note that a matrix symbol can always be represented as a vector symbol by stacking the columns/rows of the matrix into a vector). The multidimensional symbol might represent one or more coded or uncoded data symbols corresponding to SISO transmitters. The transmitted signal propagates through the channel and is received and processed by a MIMO receiver. Note that the receiver could obtain multiple received signals corresponding to each transmitted symbol. The performance of the communication system hinges on the ability of the receiver to process and find reliable estimates of the transmitted symbol based on the received signals.

Definitions

As used herein, bolded capitol symbols, such as H, represent matrices.

As used herein, bolded lower-case symbols, such as s, represent vectors.

As used herein, $^T$ denotes matrix transposition.

As used herein, * denotes the matrix conjugate transpose operation.

As used herein, $^{-1}$ denotes the matrix inverse operation.

As used herein, if W is a matrix, $W_m$ denotes the mth column of W.

As used herein, if W is a matrix, $(W^T)_m$ denotes the mth row of W.

As used herein, if v is a vector, $\|v\|_2$, denotes the 2-norm of v.

As used herein, if Q(.) represents the symbol slicing function, it will be assumed to slice both single symbols and multi-dimensional symbol vectors.

As used herein, $I_M$ represents the M by M identity matrix.

As used herein, $0_{M \times N}$ represents the M by N matrix of zeros.

As used herein, if A and B are sets, then A|B is the set of all elements in A that are not in B.

For MIMO systems such as, but not limited to, the ones discussed herein above, the received signal can be written, after front end receive processing such as filtering, down-conversion, AGC, synchronization etc., in the form $$y_k = \sum_n H_n s_{k-n} + v \qquad (1)$$

where $H_n$ is an $M_r$ by $M_t$ matrix of complex gains, $S_k$ is the $M_t$-dimensional symbol vector transmitted at time k, and v is a $M_r$-dimensional vector of additive noise. In narrowband wireless systems where the symbol period is much larger than the RMS delay spread as well as in OFDM systems where the inter-symbol interference is negligible due to the insertion of a cyclic prefix and/or guard interval, the channel from each transmit antenna to each receive antenna (per frequency bin in case of OFDM) is often modeled as a single-tap complex gain. In this case equation (1) simplifies to $$y_k = H s_k + v \qquad (2)$$

where H is now an $M_r$ by $M_t$ matrix of complex numbers and $Hs_k$ is the matrix product of H and $s_k$.

The receiver must estimate the symbol matrix S = $[s_1 \ldots s_T]$ in order to facilitate reliable communication. Examples, but by no means the only examples, of multidimensional symbols could be space-time codes where T>1 or spatial multiplexing systems with T=1 and independent SISO modulation on each transmit antenna. In case of no or negligible additive noise, v, and an invertible H, the estimation problem would reduce to that of inverting H. The presence of non-negligible noise, however, increases the difficulty in estimating S. Note that we have assumed that the receiver is has some estimate of H, that could be obtained by transmitting appropriate training sequences. The symbol matrix S is also assumed to be chosen from a finite set C of possible multidimensional symbols (this is typically the case as for e.g. where each element of S is chosen from a QAM symbol set).

The optimal solution in the sense of minimizing the probability of symbol error has been shown to be the maximum aposterior (MAP) decoder which in case of equiprobable symbol transmissions is equivalent to a maximum likelihood (ML) decoder. The ML decoder attempts to find S, the symbol matrix, by using the symbol matrix Ŝ that maximizes p(Ŝ|y$_1$, . . . ,y$_T$) where p (.|y$_1$, . . . , y$_{kT}$) is the conditional probability density function (pdf) of $s_k$ given y$_1$, . . . , y$_T$. In real-time communications systems, however, this type of decoder is overly computationally complex. Decoders that search over a set V of possible multidimensional symbols S and decode to the multidimensional symbol Ŝ in V that minimizes some sort of metric are denoted as minimum distance (MD) decoders. The MAP and ML decoders are MD decoders with V=C, where C is the set of all possible multidimensional symbols S.

Many algorithms that are computationally easier than ML decoding have been proposed in order to overcome the huge computational burden of ML decodings. Algorithms that perform some form of reduced complexity decoding will be referred to herein as sub-optimal decoders. An example of a suboptimal decoder is successive interference cancellation (SIC) method. A receiver using SIC decodes each symbol within the symbol vector one at a time. After each symbol is decoded, its approximate contribution to the received vector is subtracted in order to improve the estimate of the next symbol within the symbol vector. The order of symbol decoding and subtraction could be arbitrary or based on rules such as maximization of pre/post processing SNR etc.

An example of an SIC receiver is the ordered iterative minimum mean squared error (IMMSE) receiver. With a single-tap channel, the receive signal is given by equation (2) above. Letting $s_k=[s_1\ s_2\ \ldots\ s_{M_t}]^T$, the ordered IMMSE operates using the following steps, letting $y_{k,0}=y_k$, $D_0=\{1, 2, \ldots, M_t\}$, and $H_k^{(0)}=H$.

1. Set m=0.

2. Compute $W^m = \left(H_k^{(m)*} H_k^{(m)} + \rho I_{M_t-m}\right)^{-1} H_k^{(m)*}$.

3. Let $n = \arg\min_{i \in D_0} \|(W^{(m)T})_i\|_2$.

4. Set $\tilde{s}_{k,n} = Q(y_{k,m}^T (W^{(m)T})_i)$.

5. Set $y_{k,m+1} = y_{k,m} - H_{k,n}^{(m)}\tilde{s}_{k,n}$, $D_{m+1} = D_m \setminus \{n\}$, and $H_k^{(m+1)} = \left[H_{k,1}^{(m+1)} H_{k,2}^{(m+1)} \ldots H_{k,n-1}^{(m+1)} 0_{M_r \times 1} H_{k,n+1}^{(m+1)} \ldots H_{k,M_1}^{(m+1)}\right]$.

6. Repeat steps 1-5 for $m < M_t$.

7. Set the decoded symbol vector to $\tilde{s}_k = [\tilde{s}_{k,1}\ \tilde{s}_{k,2}\ \ldots\ \tilde{s}_{k,M_t}]^T$.

Regarding the above algorithm, it is important to note that $$H_{k,i}^{(m+1)}$$

denotes the ith row of the matrix $$H_k^{(m+1)}$$

(time k and iteration m+1). Another example among sub-optimal decoders is the zero-forcing decoder which decodes to the symbol $\tilde{s}_k = Q(H^{-1}y_k)$. This decoder is usually considered the worst performing and least complex of the sub-optimal decoders.

Sub-optimal techniques unfortunately differ in diversity order from ML decoding (i.e. the asymptotic slope of the average probability of bit error curve). They essentially trade reduced complexity for reduced performance.

In view of the foregoing, it is both advantageous and desirable to find other low complexity schemes with performance closer to an ML decoder, while still being low in complexity.

SUMMARY OF THE INVENTION

The present invention is directed to a reduced search space decoding method. It provides an average probability of error performance closer to optimal decoding. The decoding algorithm provides dramatic complexity reductions as compared to optimal decoding.

According to one embodiment, a method of decoding a multidimensional symbol comprises the steps of receiving a collection of signal vectors $y_1 \ldots y_k$, with k denoting a positive integer, into a sub-optimal decoder and generating an estimated transmitted multidimensional symbol $\tilde{S}$ therefrom; decoding the estimated transmitted multidimensional symbol $\tilde{S}$ via hierarchical subset decoding and determining a subset therefrom; generating a reduced search space V; and decoding the received symbol vectors $y_1 \ldots y_k$ via minimum distance decoding using the reduced search space V and generating one or more of the following: an estimated multidimensional symbol $\tilde{S}$, soft bit information, or hard bit information therefrom.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
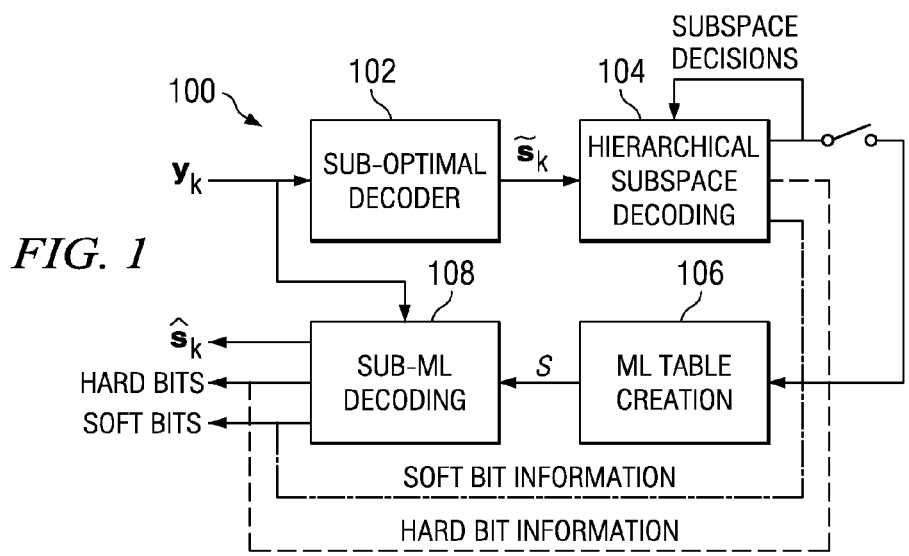
FIG. 1 is a block diagram illustrating a hierarchical reduced search space maximum likelihood algorithm according to one embodiment of the present invention.

FIG. 1 is a block diagram illustrating a hierarchical reduced search space decoding method 100 according to one embodiment of the present invention. Received signal vectors $y_1 \ldots y_k$ are fed into a sub-optimal decoder 102 that yields an estimate $\tilde{S}$ of the transmitted symbol vector. One example of this would be the zero-forcing decoder where k=T $$\tilde{S} = H^{-1}[y_1 \ldots y_T]. \quad (3)$$

Figure 2:
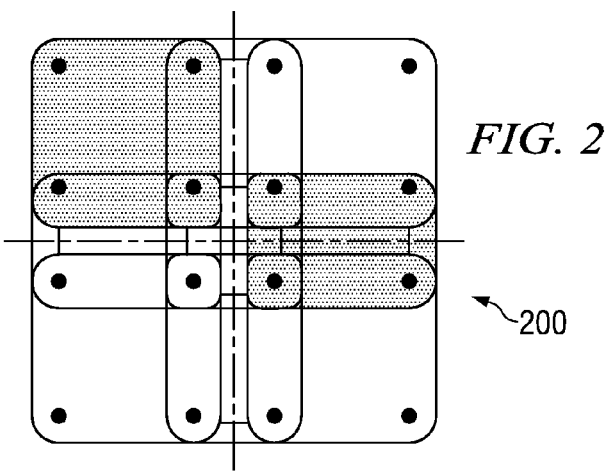
FIG. 2 depicts an example grouping for a 16-QAM constellation.

The estimate $\tilde{S}$ is then fed into a hierarchical subset decoding block 104. The set of $N_s$ possible symbol vectors is then grouped into overlapping subsets. An example of this grouping for a system where each transmitter is using 16-QAM and T=1 would be to group each dimension as shown in FIG. 2 that illustrates a grouping 200 for a 16-QAM constellation.

Each subset is represented by a multidimensional point $c_i$. A subset is chosen if its representative point $c_i$ minimizes $d(c_i, \tilde{S})$ where d is some sort of metric. The subset decoder 104 is hierarchical in that it can zoom into a region. Suppose for example, that each transmitter was using 64-QAM and T=1. This is easily seen to be 16-QAM per quadrant. The 64-QAM constellation could be divided up similarly to that shown in FIG. 2, but with each grouping containing 16 symbol points instead of four. After a hard decision is made upon which of the nine possible regions to search over, the center point of the region could be subtracted from the estimated symbol and the subset decoding could be repeated using the 16-QAM regions shown in FIG. 2.

After a subset has been decided on, the reduced search space for that subset is created as shown in block 106. Minimum distance decoding is then performed as shown in block 108 using the reduced search space V. This minimum distance decoding can use different metrics for "distance" for e.g., the Euclidean distance $\|y_k - Hv\|^2$.

The inventors found method 100 to provide an average bit error rate performance between that of optimal MAP decoding and sub-optimal decoders. The method 100, while more complex than sub-optimal decoding, is many times less complex than MAP decoding.

Figure 3:
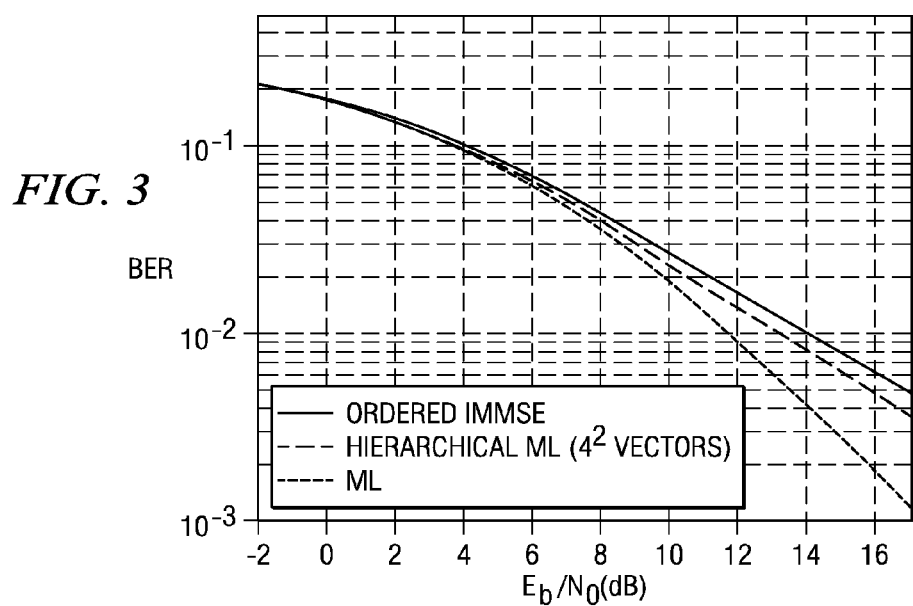
FIG. 3 shows the average probability of bit error for the hierarchical reduced search space maximum likelihood algorithm depicted in FIG. 1 as well as ordered IMMSE and ML decoder schemes when S is generated by vectors with each entry using SISO modulation.

Any suboptimal decoder that outputs soft bit information can be combined with the hierarchical search space maximum likelihood decoding 104, as discussed herein before. The inventors simulated a MIMO system with T=1 with each antenna using independent 16-QAM modulation using a decoder to implement the hierarchical reduced search space maximum likelihood algorithm 100 using the unordered zero-forcing decoder (i.e. channel matrix inversion). FIG. 3 shows the performance of this decoder compared with ordered IMMSE and ML decoding. The hierarchical decoder was found to obtain approximately a 0.8 dB improvement at a bit error rate of $10^{-2}$ over ordered IMMSE decoding.

In summary explanation, a reduced search space minimum distance decoding method provides average probability of error performance between sub-optimal decoding and MAP decoding. The decoding algorithm provides dramatic complexity reductions compared with MAP decoding.

In view of the above, it can be seen the present invention presents a significant advancement in the art of multiple-input multiple-output (MIMO) communication systems. Further, this invention has been described in considerable detail in order to provide those skilled in the decoder art with the information needed to apply the novel principles and to construct and use such specialized components as are required.

Further, in view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method of decoding a multidimensional symbol, the method comprising:
   receiving a plurality of signal vectors $y_1 \ldots y_k$ into a sub-optimal decoder and generating an estimated transmitted multidimensional symbol $\tilde{S}$ therefrom;
   decoding the estimated transmitted symbol vector $\tilde{S}$ via hierarchical subset decoding and determining a subset therefrom;
   generating a reduced search space V associated with the subset; and
   decoding the plurality of signal vectors $y_1 \ldots y_k$ via minimum distance decoding using the reduced search space V $\hat{S}$.

2. The method according to claim 1 wherein generating a reduced search space V comprising generating the reduced search space V by minimizing a metric.

3. The method according to claim 1 wherein generating a reduced search space V associated with the subset comprising generating the reduced search space by minimizing a metric corresponding to the subset prior to generation of the subset.

4. The method according to claim 1 wherein receiving a plurality of signal vectors $y_1 \ldots y_k$ into a sub-optimal decoder and generating an estimated transmitted multidimensional symbol $\tilde{S}$ therefrom comprising receiving the plurality of signal vectors $y_1 \ldots y_k$ into the sub-optimal decoder and generating soft bit information therefrom.

5. The method according to claim 1 wherein decoding the received the-plurality of signal vectors $y_1 \ldots y_k$ via minimum distance decoding using the reduced search space V comprising decoding the received plurality of signal vectors $y_1 \ldots y_k$ via minimum distance decoding using the reduced search space V and generating a multidimensional symbol $\hat{S}$ in space V therefrom.

6. The method according to claim 1 wherein receiving a plurality of signal vectors $y_1 \ldots y_k$ into a sub-optimal decoder and generating an estimated transmitted multidimensional symbol vector $\tilde{S}$ therefrom comprising receiving the plurality of signal vectors $y_1 \ldots y_k$ into an interference cancellation decoder and generating the estimated transmitted symbol vector $\tilde{S}$ therefrom.

7. The method according to claim 6, wherein the interference cancellation decoder is selected from the group consisting of a successive interference cancellation decoder, and a parallel interference cancellation decoder.

8. The method according to claim 1 wherein receiving a plurality of signal vectors $y_1 \ldots y_k$ into a suboptimal decoder and generating an estimated transmitted multidimensional symbol vector $\tilde{S}$ therefrom comprising receiving the plurality of signal vectors $y_1 \ldots y_k$ into an ordered or unordered linear decoder and generating the estimated transmitted multidimensional symbol vector $\tilde{S}$ therefrom.

9. The method according to claim 8, wherein the linear decoder consists of a decoder selected from the group consisting of a zero forcing decoder, a MMSE decoder, and a matched filter decoder.

10. The method according to claim 1, wherein the multidimensional transmitted symbol $\hat{S}$ is represented by the relationship $$\hat{S} = \arg\min_{v \in V} m(y_1, \ldots, y_k, v),$$

and wherein m is any metric.

11. The method according to claim 1, wherein decoding the estimated transmitted symbol vector $\tilde{S}$ via hierarchical subset decoding and determining a subset therefrom comprises:
   defining a hierarchical subset as an ordered set of subsets that cover a multidimensional constellation, wherein the hierarchical subsets are ordered such that if R_k is a subset of the multidimensional signal space that the signal is detected to lie within at some step k, said R_k subset is derived into subsets {R_{n, 1}, . . . , R_{n,L}} such that the union of these subsets spans R_k; and
   decoding the received symbol vectors over the subset R_k using a desired distance.

12. The method according to claim 11, wherein the multidimensional symbol is detected to lie within R_k at some step k the receiver further determines whether the multidimensional symbol lies in one of the subsets {R_{n,1}, . . . , R_{n,L}} by computing the Euclidean distance between the received symbol vector and the centeriod of each of the subsets.

* * * * *